(12) United States Patent
Sun et al.

(10) Patent No.: US 10,690,477 B2
(45) Date of Patent: Jun. 23, 2020

(54) MEASURING DEVICE AND GRILLING APPARATUS INCLUDING THE SAME

(71) Applicant: Tsann Kuen (Zhangzhou) Enterprise Co., Ltd., Zhangzhou, Fujian (CN)

(72) Inventors: Xiaosen Sun, Zhangzhou (CN); Canjia Cai, Zhangzhou (CN); Jingui Wang, Zhangzhou (CN)

(73) Assignee: TSANN KUEN (ZHANGZHOU) ENTERPRISE CO., LTD., Zhangzhou, Fujian (CN)

( * ) Notice: Subject to any disclaimer, the term of this patent is extended or adjusted under 35 U.S.C. 154(b) by 242 days.

(21) Appl. No.: 15/874,251

(22) Filed: Jan. 18, 2018

(65) Prior Publication Data

US 2018/0209776 A1 Jul. 26, 2018

(30) Foreign Application Priority Data

Jan. 25, 2017 (CN) .......................... 2017 1 0060526
Dec. 25, 2017 (CN) .......................... 2017 1 1420403

(51) Int. Cl.
| | |
|---|---|
| *G04C 3/00* | (2006.01) |
| *G01B 7/30* | (2006.01) |
| *A47J 37/06* | (2006.01) |

(52) U.S. Cl.
CPC ............. *G01B 7/30* (2013.01); *A47J 37/0611* (2013.01)

(58) Field of Classification Search
CPC ......... A47J 37/00; A47J 37/0611; G01B 7/30; H05B 6/06
USPC ..................................................... 324/207.25
See application file for complete search history.

(56) References Cited

U.S. PATENT DOCUMENTS

2009/0052123 A1* 2/2009 Takeya ................... G01D 5/145
361/679.27
2016/0022091 A1* 1/2016 Freymiller ........... A47J 37/0611
426/233

* cited by examiner

*Primary Examiner* — Melissa J Koval
*Assistant Examiner* — Courtney G McDonnough
(74) *Attorney, Agent, or Firm* — Birch, Stewart, Kolasch & Birch, LLP

(57) ABSTRACT

A measuring device to be mounted on a grill device includes a processing unit, and a magnetic unit and a sensing unit that are mounted respectively on pivotally connecting first and second grilling units of the grill device. The sensing unit measures an angle of rotation of a magnetic field generated by the magnetic unit, and generates an output signal indicating the angle of rotation of the magnetic field. The processing unit obtains an included angle between the first and second grilling units based on the angle of rotation of the magnetic field indicated by the output signal received from the sensing unit.

20 Claims, 10 Drawing Sheets

MEASURING DEVICE AND GRILLING APPARATUS INCLUDING THE SAME

CROSS-REFERENCE TO RELATED APPLICATION

This application claims priorities to Chinese Patent Application No. 201710060526.2, filed on Jan. 25, 2017 and Chinese Patent Application No. 201711420403.1 filed on Dec. 25, 2017.

FIELD

This disclosure relates to a cooking device, more particularly to a grilling apparatus including a measuring device.

BACKGROUND

A conventional grill device usually includes pivotally-connected upper and lower grilling modules provided respectively with upper and lower grilling plates. A user is required to seta grilling time duration for cooking food disposed between the upper and lower grilling plates. However, determination of the grilling time duration is relatively difficult for a user who has little experience on grilling food. As a result, the food may not be properly cooked when the grill device is operated by an inexperienced user.

SUMMARY

Therefore, the object of the present disclosure is to provide a grilling apparatus capable of measuring a thickness of food to be cooked to thereby determine a grilling time duration for the food.

According to one aspect of this disclosure, a measuring device to be mounted on a grill device is provided. The grill device includes a first grilling unit and a second grilling unit pivotally connected to the first grilling unit and rotatable with respect to the first grilling unit about a rotation axis. The measuring device includes a magnetic unit, a sensing unit and a processing unit. The magnetic unit is to be mounted on one of the first and second grilling units and is configured to generate a magnetic field. The sensing unit is to be mounted on the other one of the first and second grilling units and is configured to measure an angle of rotation of the magnetic field generated by the magnetic unit and to generate an output signal indicating the angle of rotation of the magnetic field. The processing unit is communicatively connected to the sensing unit for receiving the output signal therefrom, and is configured to obtain an included angle between the first and second grilling units based on the angle of rotation of the magnetic field indicated by the output signal.

According to another aspect of this disclosure, a grilling apparatus including a grill device and a measuring device is provided. The grill device includes a first grilling unit, and a second grilling unit pivotally connected to the first grilling unit and rotatable with respect to the first grilling unit about a rotation axis. The measuring device includes a magnetic unit, a sensing unit and a processing unit. The magnetic unit is mounted on one of the first and second grilling units, and is configured to generate a magnetic field. The sensing unit is mounted on the other one of the first and second grilling units, and is configured to measure an angle of rotation of the magnetic field generated by the magnetic unit and to generate an output signal indicating the angle of rotation of the magnetic field. The processing unit is communicatively connected to the sensing unit for receiving the output signal therefrom, and is configured to obtain an included angle between the first and second grilling units based on the angle of rotation of the magnetic field indicated by the output signal.

BRIEF DESCRIPTION OF THE DRAWINGS

Other features and advantages of the present disclosure will become apparent in the following detailed description of the embodiments of the disclosure, with reference to the accompanying drawings, in which.

DETAILED DESCRIPTION

Figure 1:
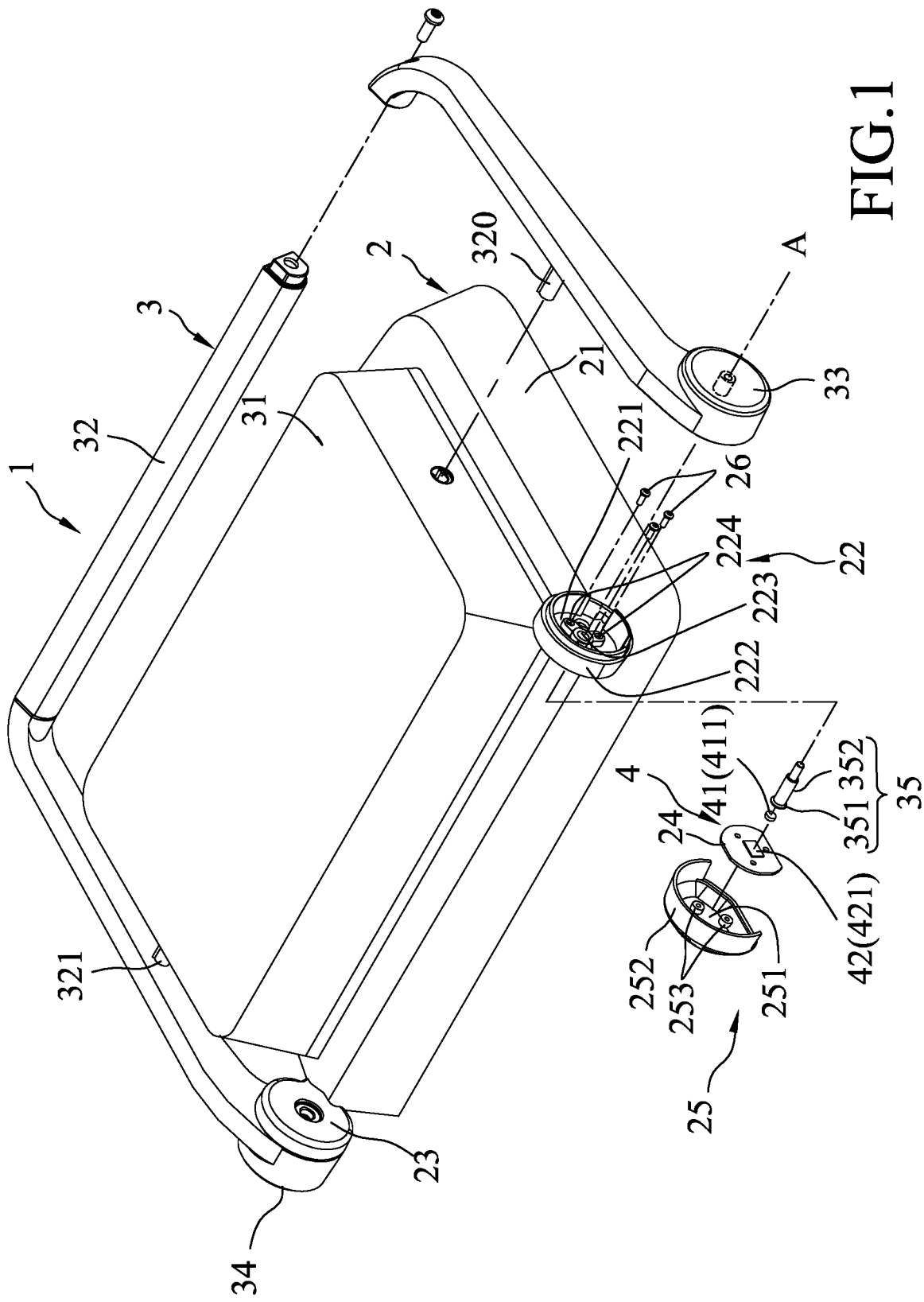
FIG. 1 is a partly exploded perspective view of a grilling apparatus according to one embodiment of the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
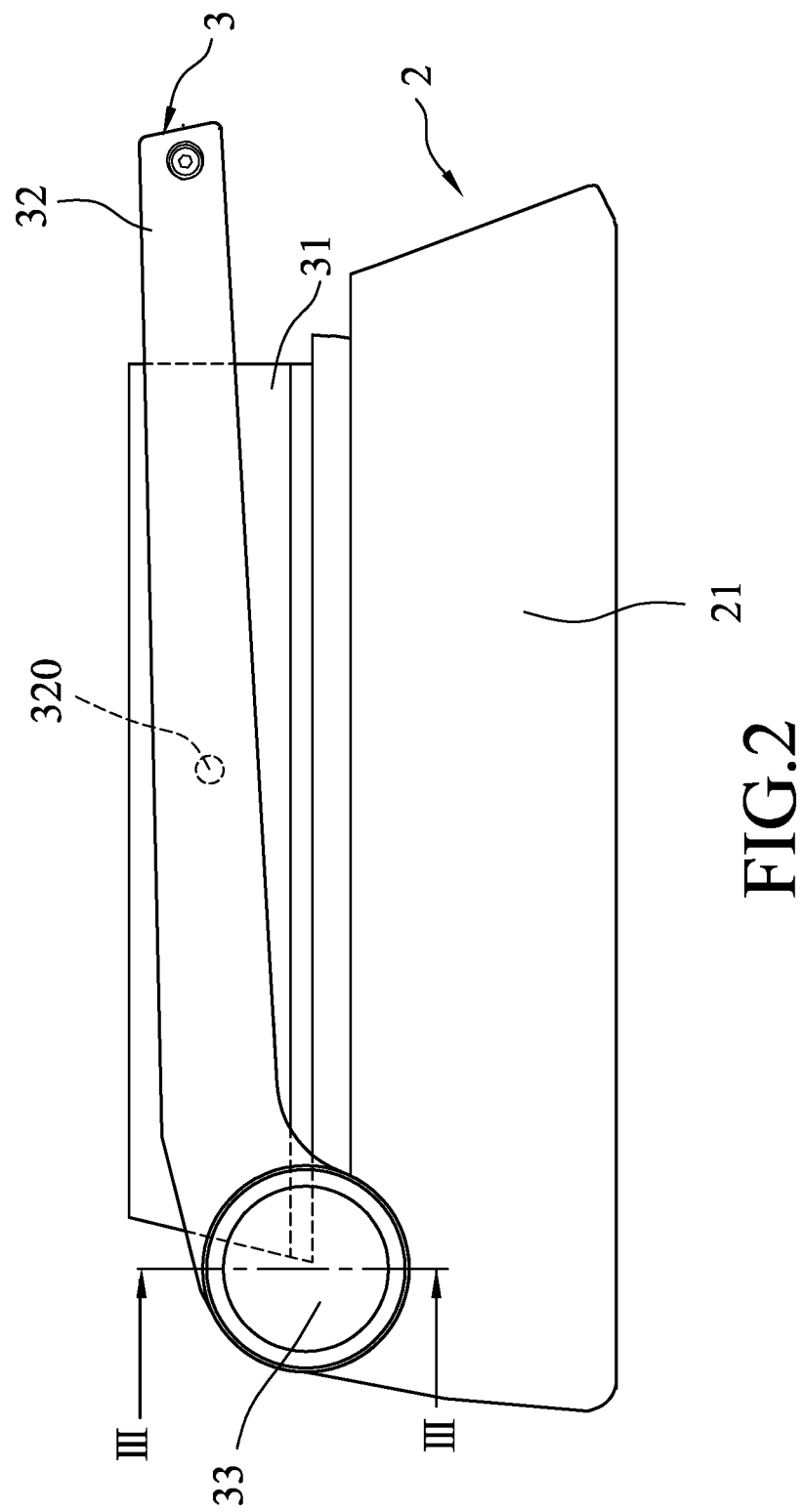
FIG. 2 is a schematic side view of the grilling apparatus of FIG. 1 for illustrating a second grilling unit lying on a first grilling unit.
Figure 3:
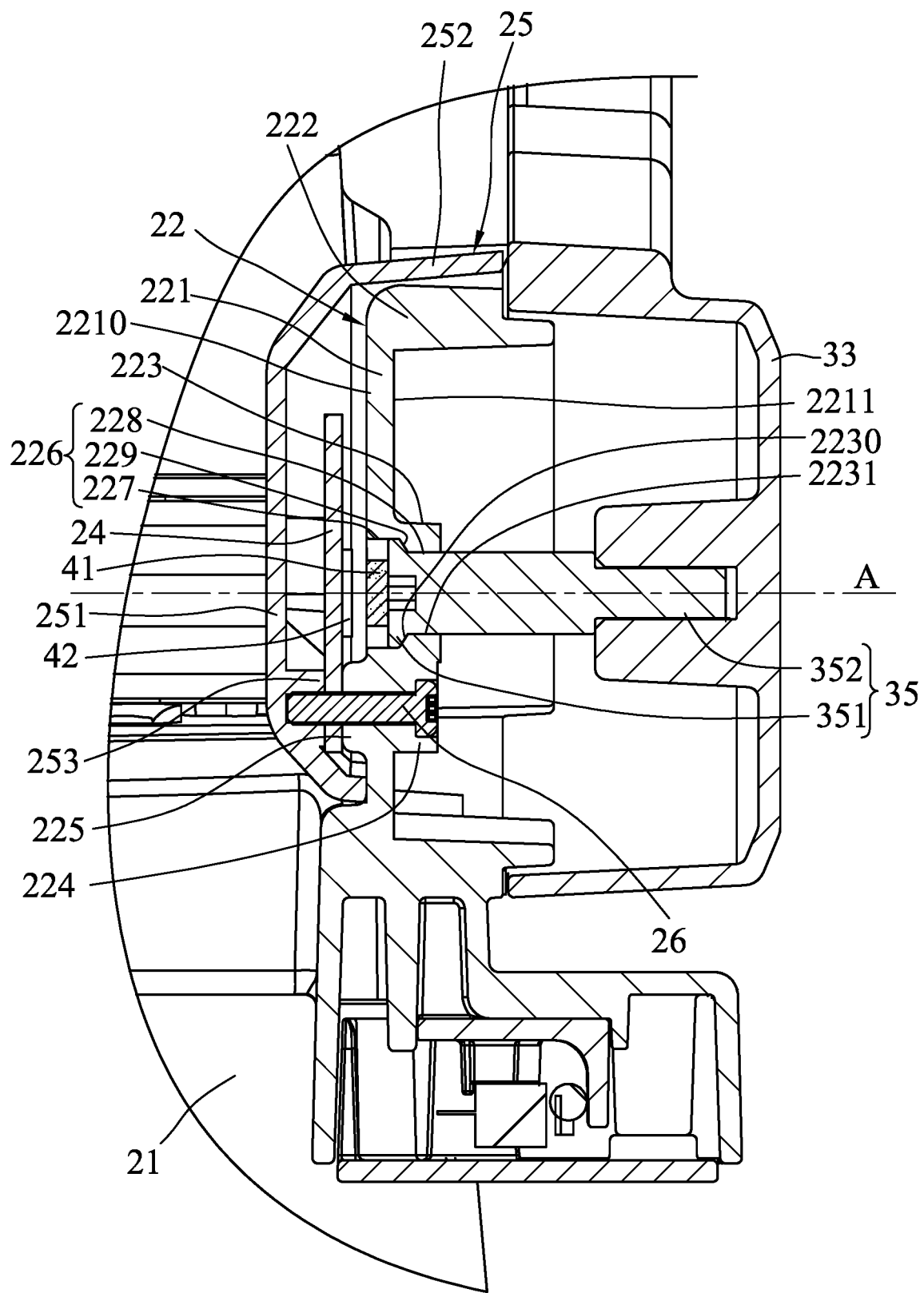
FIG. 3 is a sectional view taken along line III-III in FIG. 2.

Referring to FIGS. 1 to 3, one embodiment of the grilling apparatus according to the present disclosure includes a grill device 1, and a measuring device 4 mounted on the grill device 1. The grill device 1 includes a first grilling unit 2, and a second grilling unit 3 pivotally connected to the first grilling unit 2 and rotatable with respect to the first grilling unit 2 about a rotation axis (A).

The first grilling unit 2 includes a first grilling plate 21, a first pivot seat 22, a first auxiliary seat 23, a mounting plate 24, a housing 25, and three fastening members 26. The first grilling plate 21 has a free end and a pivot end opposite to each other in a direction transverse to the rotation axis (A). The mounting plate 24 is arranged side by side with the first pivot seat 22 along the rotation axis (A).

The first pivot seat 22 is integrated with and connected to one side of the pivot end of the first grilling plate 21, and includes abase wall 221, a first surrounding wall 222, a positioning tubular wall 223, three projections 224 (only two can be seen in FIG. 1), and three protrusions 225 (only one can be seen in FIG. 3). The first pivot seat 22 is formed with an insertion hole 226 extending along the rotation axis (A). The positioning tubular wall 223 extends from a center of the base wall 221 where the insertion hole 226 is located, is opposite to the mounting plate 24 along the rotation axis (A), and defines a part of the insertion hole 226. The protrusions 225 are formed on one side 2210 of the base wall 221 that faces the mounting plate 24, and the projections 224 extend from the other side 2211 of the base wall 221 and are registered respectively with the protrusions 225 in respective directions parallel to the rotation axis (A). The first surrounding wall 222 extends from a periphery of the base wall 221 in a direction away from the mounting plate 24 along the rotation axis (A), and surrounds the positioning tubular wall 223, the projections 224 and the protrusions 225. The first auxiliary seat 23 is integrated with and connected to the other side of the pivot end of the first grilling plate 21 at a position opposite to the first pivot seat 22 along the rotation axis (A).

The insertion hole 226 includes a large portion 227 proximate to the mounting plate 24 and having a first internal diameter, a small portion 228 away from the mounting plate 24 and having a second internal diameter smaller than the first internal diameter, and an intermediate portion 229 between the large portion 227 and the small portion 228 and having an internal diameter that gradually reduces from the large portion 227 to the small portion 228. In particular, the large portion 227 is formed in the base wall 221, and the small portion 228 and the intermediate portion 229 are defined by the positioning tubular wall 223. The positioning tubular wall 223 has frustoconical inner surface 2230 defining the intermediate portion 229, and a cylindrical inner surface 2231 defining the small portion 228.

The housing 25 includes a base plate 251 spaced apart from the base wall 221 of the first pivot seat 22 along the rotation axis (A), a curved plate 252 extending from a part of a periphery of the base plate 251 and partially covering the first surrounding wall 222, and three pillars 253 (only two can be seen in FIG. 1) extending from the base plate 251 toward the first pivot seat 22 and respectively corresponding in position to the protrusions 225 to clamp the mounting plate 24 therebetween. Each of the fastening members 26 sequentially extends through a respective one of the projections 224, a respective one of the protrusions 225 and the mounting plate 24, and then engages a respective one of the pillars 253 to thereby fasten the mounting plate 24 between the first pivot seat 22 and the housing 25. The fastening members 26 are screws in this embodiment and may be other fastening members such as rivets in other embodiments, and the present disclosure is not limited in this respect.

It should be noted that the number of the fastening members 26, the number of the projections 224, the number of the protrusions 225, and the number of the pillars 253 should be identical to each other, and are not limited to three.

The second grilling unit 3 includes a second grilling plate 31, a handle 32, a second pivot seat 33, a second auxiliary seat 34 and a connecting pin 35. The handle 32 is generally U-shaped, and has two distal ends fixedly connected to the second pivot seat 33 and the second auxiliary seat 34, respectively. The second grilling plate 31 is pivotally connected to the handle 32 by two joints 320, 321 in a manner that the grilling plate 31 vertically moves when the handle 32 rotates with respect to the first grilling unit 2 about the rotation axis (A). In particular, when the handle 32 is lifted up so as to rotate with respect to the first grilling unit 2, the second grilling plate 31 is lifted up by the handle 32 so as to vertically move up without significant rotation in relation to the first grilling plate 21. Then, when the handle 32 is released and moved in a reverse direction, the second grilling plate 31 may lie on an object (e.g., food material) disposed on the first grilling plate 21. The second auxiliary pivot seat 34 is pivotally connected to the first auxiliary pivot seat 23.

The second pivot seat 33 is pivotally connected to the first pivot seat 22 opposite to the mounting plate 24 via the connecting pin 35 that extends through the insertion hole 26. The connecting pin 35 includes a head portion 351 and a pin body 352. The head portion 351 is disposed proximate to the mounting plate 24, is further away from the second pivot seat 32 as compared to the pin body 352, and is retained in the large portion 227 and the intermediate portion 229 of the insertion hole 226 to abut against the frustoconical inner surface 2230. The pin body 352 extends from the head portion 351 through the small portion 228 of the insertion hole 226 toward the second pivot seat 33, and is connected to the second pivot seat 33.

In this embodiment, the first and second grilling units 2, 3 include a plurality of heating elements (not shown) disposed in the first and second grilling plates 21, 31 for grilling the object clamped between the first and second grilling plates 21, 31. Since the feature of this disclosure does not reside in the structure and control of the heating elements, the details of the same are omitted for the sake of brevity.

Figure 4:
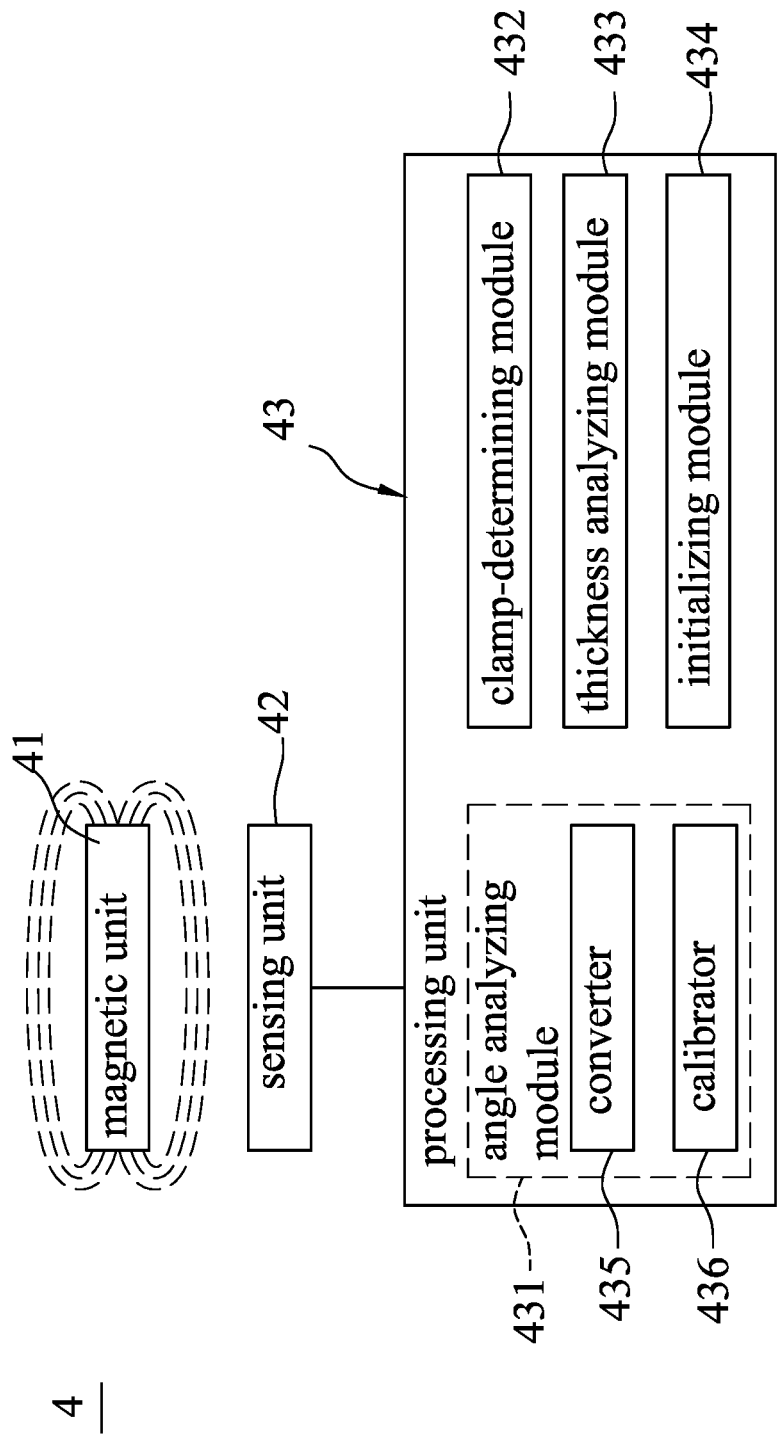
FIG. 4 is a block diagram of a measuring device of the grilling apparatus according to one embodiment of the present disclosure.
Figure 5:
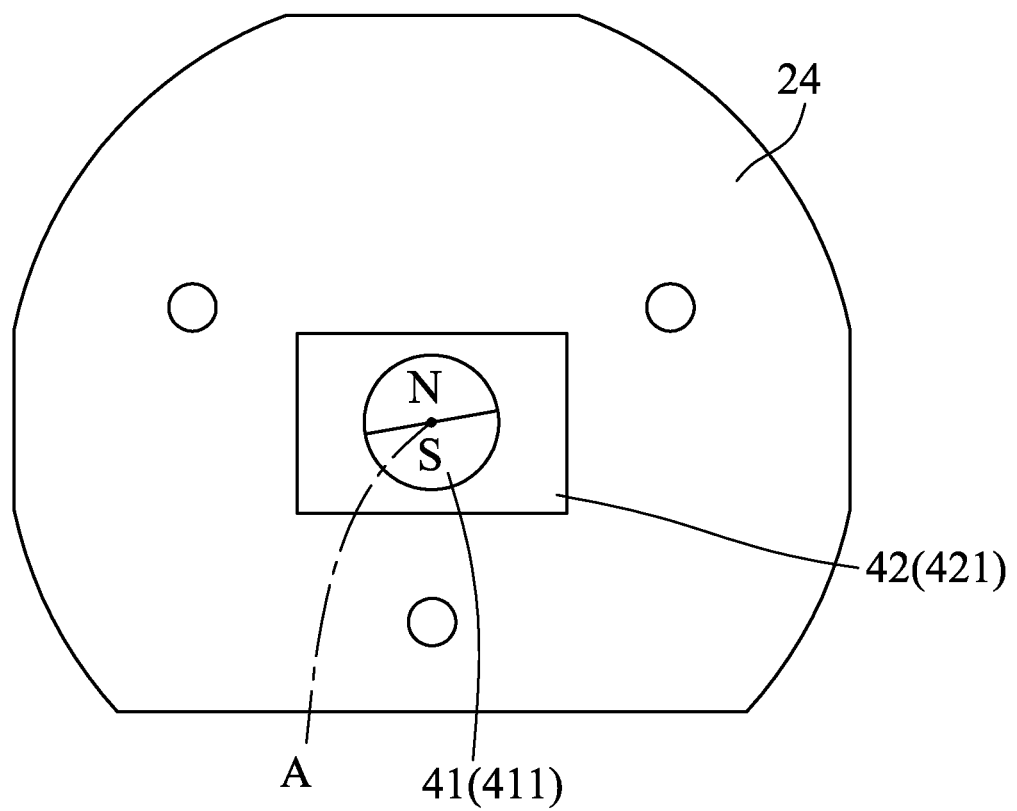
FIG. 5 is a schematic view illustrating a sensing unit and a magnetic unit of the measuring device according to one embodiment of the present disclosure.

Further referring to FIGS. 4 and 5, the measuring device 4 includes a magnetic unit 41, a sensing unit 42, and a processing unit 43. The magnetic unit 41 includes a magnet 411 for generating a magnetic field, and is mounted on the head portion 351 of the pin 35 where the rotation axis (A) passes through. In this embodiment, the magnet 411 is a permanent magnet having a north pole and a south pole opposite to each other in a direction transverse to the rotation axis (A). The magnet 411 can be an electromagnet in other embodiments, and the present disclosure is not limited in this respect.

Figure 8:
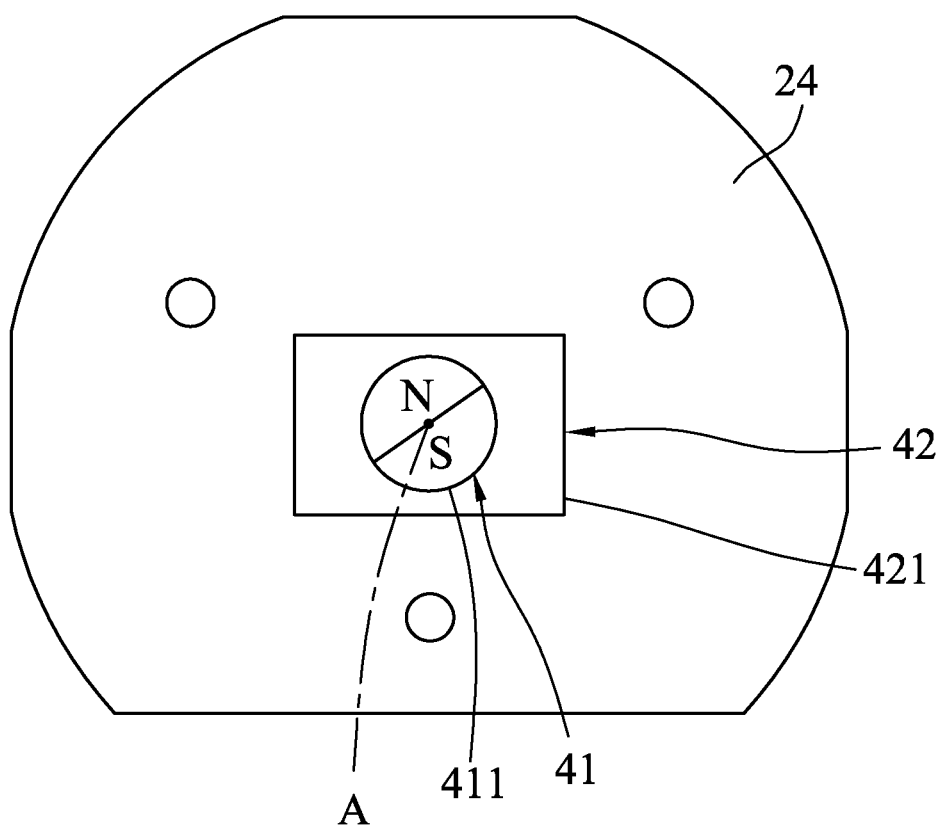
FIG. 8 is a schematic view of the measuring device illustrating the magnetic unit being rotated.

The sensing unit 42 includes a magnetic rotary position sensor 421 spaced apart from the magnet 411 along the rotation axis (A) and mounted on the mounting plate 24. Further referring to FIG. 8, as the second grilling unit 3 rotates relative to the first grilling unit 2, the magnet 411 rotates with respect to the magnetic rotary position sensor 421 about a central axis thereof that coincides the rotation axis (A). Note that the magnet 411 and the magnetic rotary sensor 421 may be respectively mounted on the mounting plate 24 and the head portion 351 in other embodiments as long as one of the magnet 411 and the magnetic rotary sensor 421 rotates about a central axis thereof that coincides the rotation axis (A) with respect to the other one of the magnetic 411 and the magnetic rotary sensor 421 as the second grilling unit 3 rotates relative to the first grilling unit 2.

The magnetic rotary position sensor 421 is configured to measure an angle of rotation of the magnetic field generated by the magnet 411, and generate an output signal indicating the angle of rotation of the magnetic field. In this embodiment, the magnetic rotary position sensor 421 is implemented by an AS5600 position sensor manufactured by ams AG.

The processing unit 43 is mounted in the grill device 1, and is electrically connected to the sensing unit 42 for receiving the output signal therefrom. The processing unit 43 is for example a microprocessor, and is programmed to include an angle analyzing module 431, a clamp-determining module 432, a thickness analyzing module 433 and an initializing module 434 for executing various calculation procedures.

The angle analyzing module 431 is programmed to calculate an included angle value of an included angle between the handle 32 and the first grilling plate 21 by analyzing the output signal received from the magnetic rotary position sensor 421, and includes a converter 435 and a calibrator 436. The converter 435 converts the output signal into a digital value indicative of the angle of rotation of the magnetic field. Specifically, the output signal outputted by the magnetic rotary position sensor 421 is an analog signal having a voltage value ranging from 0 V to 5 V, and the converter 435 performs analog-to-digital convers ion with a resolution of 12 bits on the output signal to thereby convert the output signal into an integral value discretely ranging from 0 to 4095. Then, the converter 435 further converts, for example, by linear interpolation, the integral value into the digital value ranging from 0 to 360 that is indicative of the angle of rotation of the magnet 411.

The calibrator 436 stores an initial angular value (A0) related to an initial angular position of the magnetic field generated by the magnet 411 with respect to the magnetic rotary position sensor 421 when the second grilling unit 3 lies on the first grilling unit 2. The calibrator 436 is configured to calculate the included angle value (A2) by subtracting the initial angular value (A0) from the digital value (A1) (i.e., A2=A1−A0) when the digital value is greater than or equal to the initial angular value (A1≥A0), and to calculate the included angle value (A2) by subtracting the initial angular value (A0) from a sum of 360 and the digital value (A1) (i.e., A2=(A1+360)−A0) when the digital value is smaller than the initial angular value (A1<A0).

After installation of the magnetic rotary position sensor 421 and the magnet 411 respectively on the first and second grilling units 2, 3, an angle detected by the magnetic rotary position sensor 421 may be unequal to zero degrees when the second grilling unit 3 lies directly on the first grilling unit 2. The initializing module 434 converts the angle into the initial angular value using a manner similar to the above-mentioned manner used by the converter 435 to obtain the digital value, and stores the initial angular value into the calibrator 436. By virtue of the calibrator 436, an actual angle of rotation of the magnet 411 with respect to the magnetic rotary position sensor 421 (i.e., the included angle) can be obtained.

The clamp-determining module 432 is configured to determine whether a variation in the included angle value (which is continuously obtained by the angle analyzing module 431) within a predetermined time unit, e.g., smaller than or equal to one second, is greater than a predetermined value. The predetermined time unit can be 50 milliseconds (ms) or 100 ms in other embodiments of this disclosure. Then, when the variation in the included angle value is not greater than the predetermined value, the clamp-determining module 432 further determines whether a latest included angle value is greater than a first threshold and smaller than a second threshold that is greater than the first threshold, and outputs an activation signal to the thickness analyzing module 433 when the latest included angle value is greater than the first threshold and smaller than the second threshold. In this embodiment, the predetermined value is set as 0, that is to say, when the included angle remains unchanged within the predetermined time unit (i.e., the second grilling unit 3 does not rotate), the clamp-determining module 432 determines whether the latest included angle value is greater than the first threshold and smaller than the second threshold. Further, the first threshold is set as 2, and the second threshold is set as 21. That is to say, the clamp-determining module 432 outputs the activation signal to the thickness analyzing module 433 when the included angle is greater than 2 degrees and smaller than 21 degrees. Note that the first and second thresholds and the predetermined value can be set as other values, and the present disclosure is not limited in this respect.

After the activation signal is received from the clamp-determining module 432, the thickness analyzing module 433 is activated to estimate a thickness (T) of the object based on the included angle and a reference length (L) according to a trigonometric function shown in Equation (1) below. The reference length (L) is a distance from the joint 320 to the rotation axis (A) (see FIG. 7).

$$T = L \times \sin(A2) \qquad (1)$$

The grilling apparatus is initialized to a default setting when leaving the manufacturing factory. First, the angle of the rotation (e.g., 10 degrees) of the magnet 411 is measured by the magnetic rotary position sensor 421 when the second grilling unit 3 lies directly on the first grilling unit 2 and is converted by the initializing module 434 into the initial angular value (i.e., 10), and the initial angular value thus obtained is stored in the calibrator 436. Additionally, the predetermined value is set as 0, the first threshold is set as 2, and the second threshold is set as 21.

Afterward, as shown in FIG. 2, when the second grilling unit 3 lies on the first grilling unit 2, the angle of rotation measured by the magnetic rotary position sensor 421 is 10 degrees, and the digital value obtained by the converter 435 is 10. Then, the included angle value is calculated by subtracting the initial angular value (i.e., 10) from the digital value (i.e., 10) and equals 0 (i.e., the included angle is determined to be 0 degrees). Since the included angle value is smaller than the first threshold, which is 2 in this embodiment, the clamp-determining module 432 would not output the activation signal.

Figure 6:
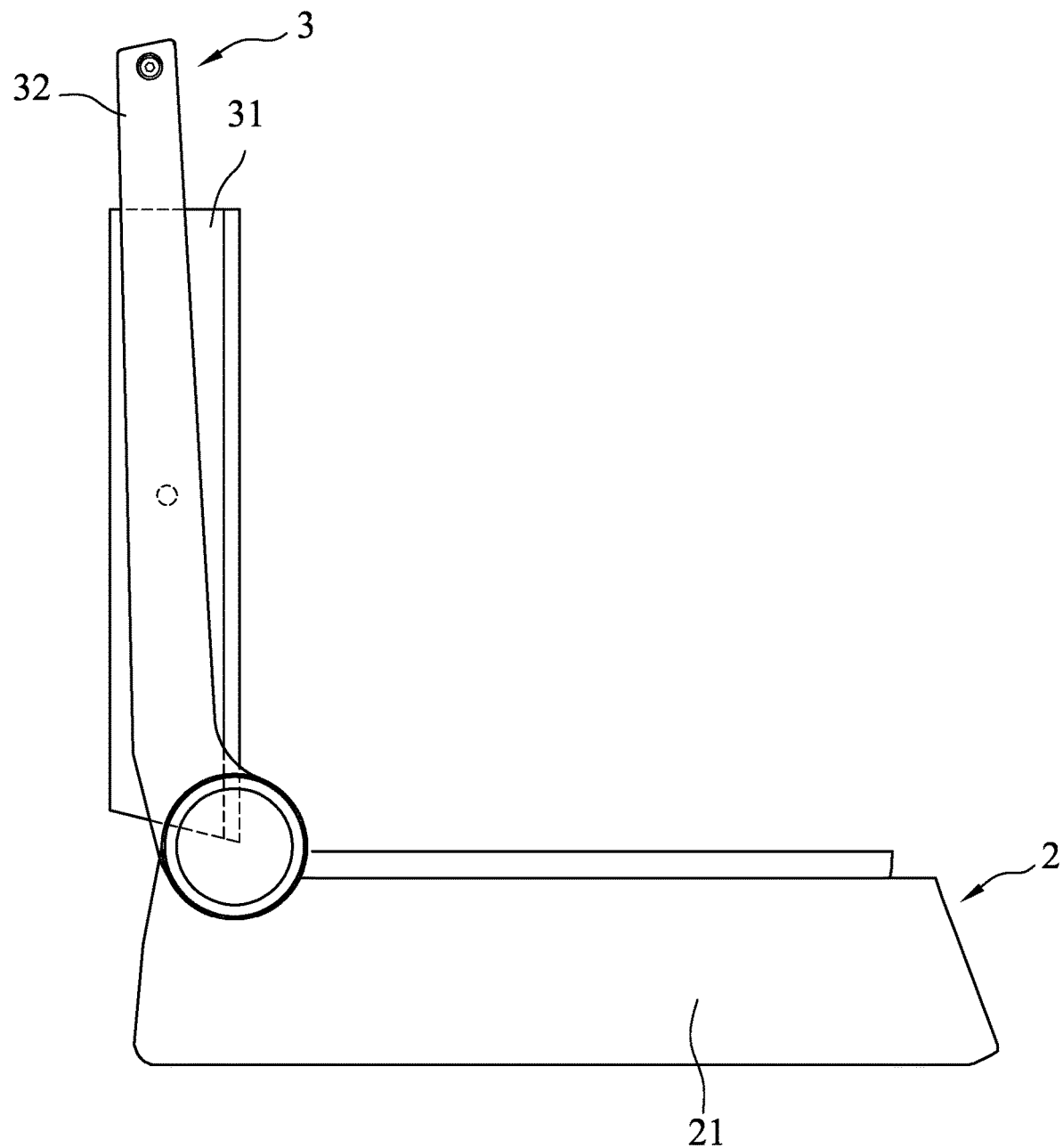
FIG. 6 is a schematic side view of the grilling apparatus for illustrating the second grilling unit being lifted relative to the first grilling unit.

When the handle 32 is lifted and rotates relative to the first grilling unit 2, the magnet 411 mounted on the head portion 351 of the pin 35 rotates with respect to the magnetic rotary position sensor 421. During the rotation of the handle 32, the variation in the included angle value within the predetermined time unit is greater than the predetermined value, i.e., 0 in this embodiment, so the clamp-determining module 432 continues to determine whether the variation in the included angle value is smaller than the predetermined value without outputting the activation signal to the thickness analyzing module 433. After the second grilling plate 31 is stably positioned, e.g., as shown in FIG. 6, the angle of rotation measured by the magnetic rotary position sensor 421 is, e.g., 90 degrees, and the included angle equals to 80 degrees (90−10=80). Since this included angle value of 80 is greater than the second threshold, i.e., 21 in this embodiment, the clamp-determining module 432 does not output the activation signal.

Figure 7:
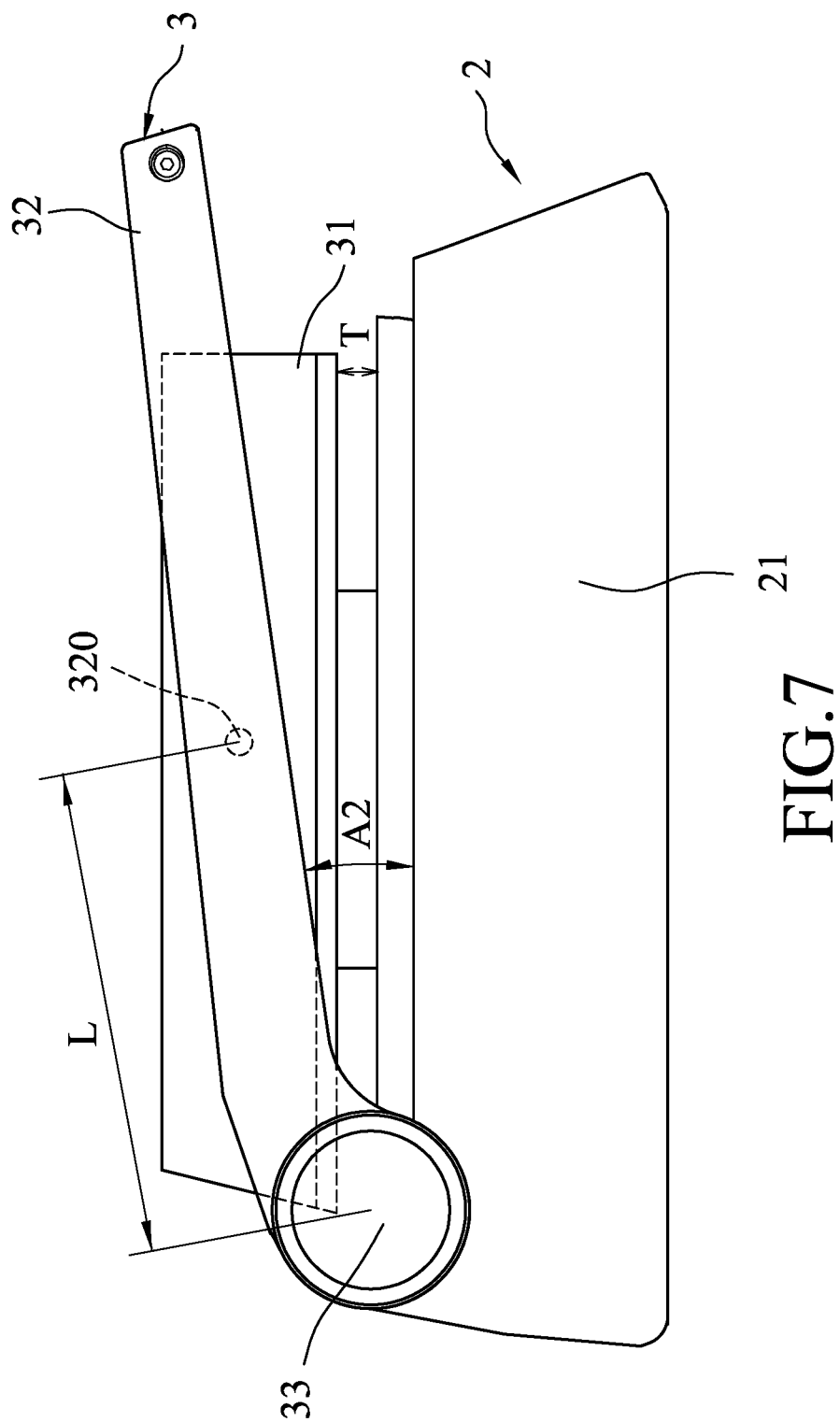
FIG. 7 is a schematic side view of the embodiment for illustrating an object being clamped between the first and second grilling units.

Further referring to FIG. 7, after the object is disposed on the first grilling plate 21 and the handle 32 is lowered down and the second grilling plate 31 stably lies on the object for at least the predetermined time unit, the variation in the included angles within the predetermined time unit is not greater than the predetermined value, so the clamp-determining module 432 further determines whether the included angle value obtained latest from the angle analyzing module 431 is smaller than the second threshold and greater than the first threshold.

For example, the angle of rotation of the magnetic field measured latest by the magnetic rotary position sensor 421 is 25 degrees, the digital value obtained by the converter 435 is 25, and thus, the included angle value is calculated to be 15 by subtracting the initial angular value of 10 from the digital value of 25 (25−10=15). Since the included angle value is smaller than the second threshold (21) and greater than the first threshold (2), the clamp-determining module 432 outputs the activation signal to the thickness analyzing module 433, such that the thickness analyzing module 433 is activated to estimate the thickness of the object according to Equation (1) upon receipt of the activation signal.

It should be noted that, if the initial angular value is determined to be 350 and the angle of rotation measured by the magnetic rotary position sensor 421 is 2 degrees, since the digital value (i.e., 2) is smaller than the initial angular value of 350, the included angle value is calculated to be 12 by subtracting the initial angular value from a sum of 360 and the digital value, i.e., (360+2)−350=12.

When the thickness of the object clamped between the first and second grilling plates 21, 31 is obtained, the grilling apparatus can further determine a grilling time duration in which the heating elements are to be turned on for grilling the object with reference to the thickness estimated by the thickness analyzing module 433. For example, the grilling apparatus may store a lookup table having a plurality of time lengths corresponding respectively to a plurality of thicknesses, and determine one of the time lengths as the grilling time duration according to the lookup table with reference to the thickness estimated by the thickness analyzing module 433. Alternatively, the grilling apparatus may be programmed with an equation for calculating the grilling time duration based on the thickness. Generally, the grilling time duration is directly proportional to the thickness of the object, and thus the equation may for example be a linear equation.

Note that in other embodiments, the grilling time duration may be determined directly based on the included angle value calculated by the angle analyzing module 431 without estimating the thickness of the object. For example, since the thicker the object, the larger the included angle, the grilling time duration can be determined directly based on the included angle value that is usually in positive correlation to the grilling time duration. Similarly, the grilling apparatus can be programmed with an equation for calculating the grilling time duration directly based on the included angle value. The present disclosure is not limited in the aspect of how the grilling time duration is determined.

Additionally, if, after installation of the magnetic rotary position sensor 421 and the magnet 411 respectively on the first and second grilling units 2, 3, an angle detected by the magnetic rotary position sensor 421 is equal to zero degrees when the second grilling unit 3 lies directly on the first grilling unit 2, it is not required to initialize the grilling apparatus and the initializing module 434 and the calibrator 436 can be omitted. In such embodiment, the digital value derived from the angle of rotation measured by the magnetic rotary position sensor 421 can directly serve as the included angle value.

Figure 9:
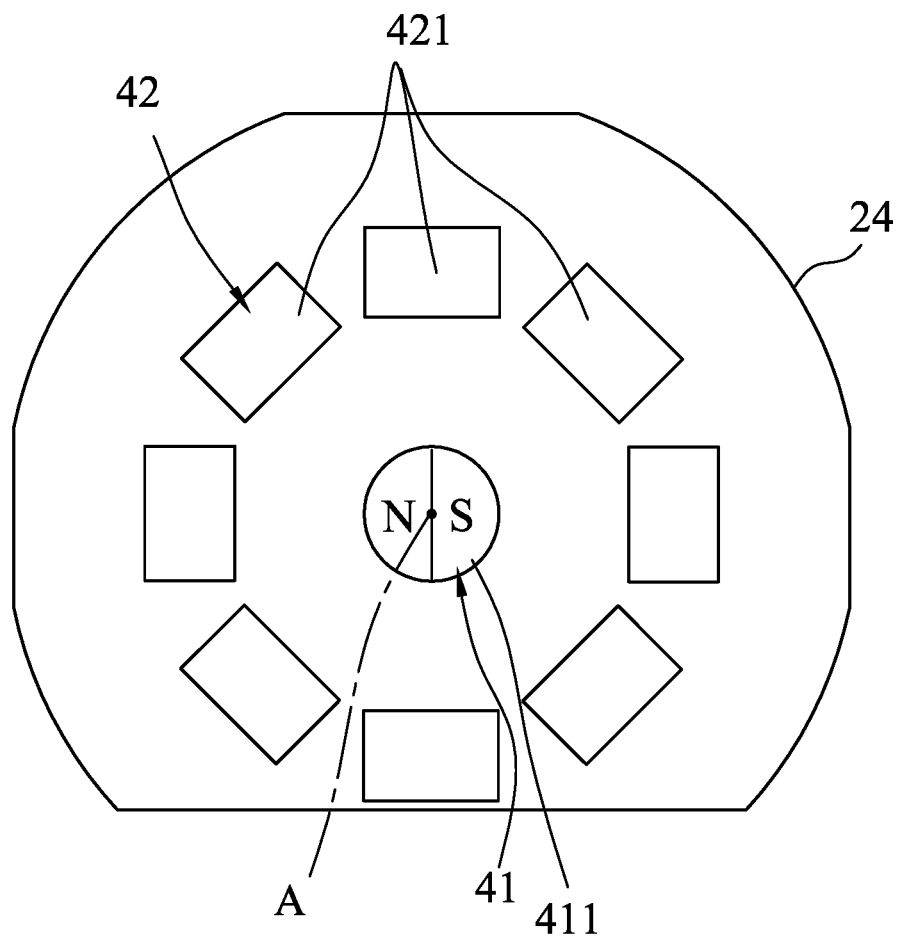
FIG. 9 is a schematic view illustrating a sensing unit and a magnetic unit of the measuring device according to another embodiment of the present disclosure.

Referring to FIG. 9, the sensing unit 42 of the measuring device 4 according to another embodiment of this disclosure includes eight magnetic rotary position sensors 421 disposed on the mounting plate 24. The magnetic rotary position sensors 421 are angularly spaced apart from one another with respect to the rotation axis (A), and surround the magnet 411 to measure the angle of rotation of the magnetic filed generated by the magnet 411.

Figure 10:
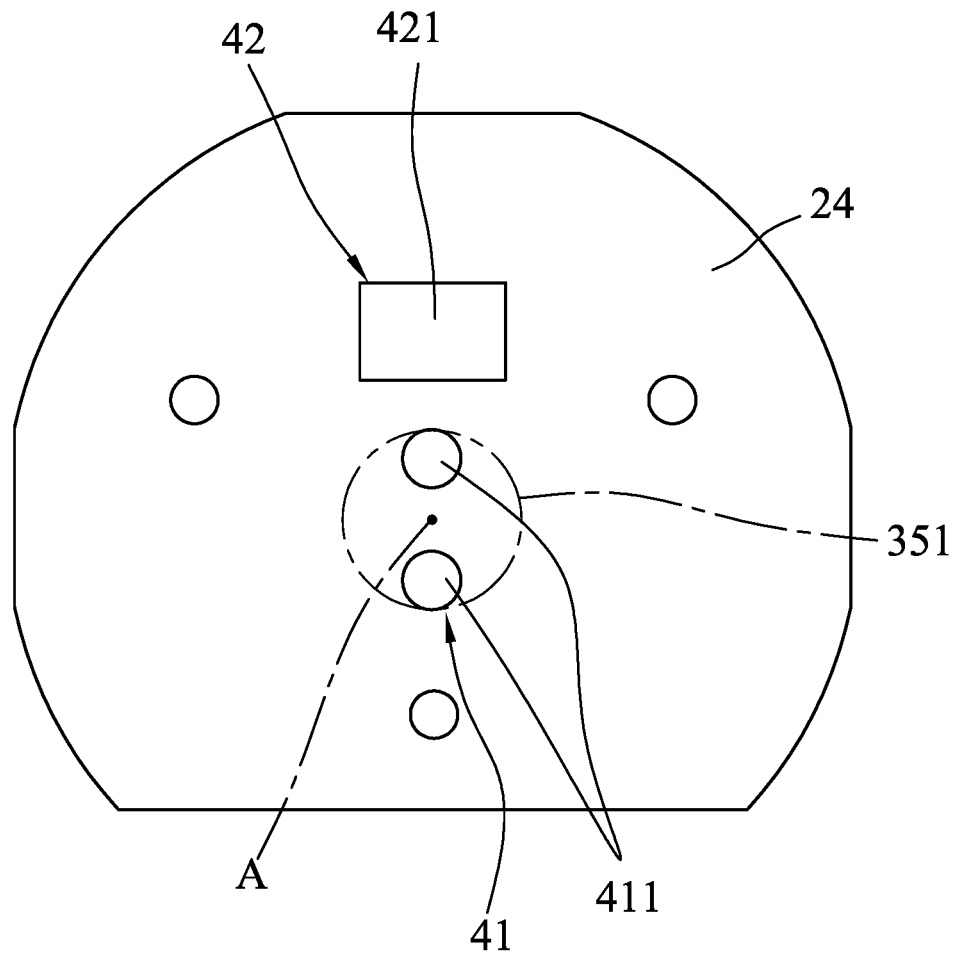
FIG. 10 is a schematic view illustrating a sensing unit and a magnetic unit of the measuring device according to yet another embodiment of the present disclosure.

Now referring to FIG. 10, the magnetic unit 41 of the measuring device 4 according to yet another embodiment of this disclosure includes two magnets 411 for generating the magnetic field. The magnets 411 are symmetrically arranged on the head portion 351 around a central point which the rotation axis (A) passes through, and are angularly spaced apart from one another with respect to the center (i.e., the rotation axis (A)). In this embodiment, the two magnets 411 are radially opposite to each other, and the magnetic rotary position sensor 421 of the sensing unit 42 is disposed on the mounting plate 24 out of a smallest imaginary circle that encircles the magnets 411 and that has the central point as a center. Note that the magnetic unit 41 may include more than two magnets 411 equidistantly and/or equiangularly arranged around the central point on the head portion 351 of the pin 35, and the present disclosure is not limited to the number of the magnets 411.

To sum up, in the present disclosure, by virtue of the configuration of the grill device 1 and the measuring device 4, the included angle between the first and second grilling units 2, 3 can be obtained when the second grilling unit 3 pivots relative to the first grilling unit 2 to thereby estimate the thickness of an object clamped between the first and second grilling units 2, 3. Further, the grilling apparatus of the present disclosure can determine the grilling time duration for grilling the object based on the estimated thickness. Accordingly, even an inexperienced user may grill food to an appropriate doneness using the grill apparatus of this disclosure.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the present disclosure has been described in connection with what is considered the exemplary embodiment, it is understood that this disclosure is not limited to the disclosed embodiment but is intended to cover various arrangements included within the spirit and scope of the broadest interpretations and equivalent

What is claimed is:

1. A measuring device to be mounted on a grill device, the grill device including a first grilling unit, and a second grilling unit pivotally connected to the first grilling unit and rotatable with respect to the first grilling unit about a rotation axis, said measuring device comprising:

a magnetic unit to be mounted on one of the first and second grilling units, and configured to generate a magnetic field;

a sensing unit to be mounted on the other one of the first and second grilling units, and configured to measure an angle of rotation of the magnetic field generated by said magnetic unit and to generate an output signal indicating the angle of rotation of the magnetic field; and a processing unit communicatively connected to said sensing unit for receiving the output signal therefrom, and configured to obtain an included angle between the first and second grilling units based on the angle of rotation of the magnetic field indicated by the output signal;

wherein said magnetic unit is to be mounted in a manner that the rotation axis passes through a smallest imaginary circle encircling said magnet unit, said sensing unit is spaced apart from said magnet unit, and one of said magnet unit and said sensing unit is rotatable with respect to the other one of said magnet unit and said sensing unit about the rotation axis.

2. The measuring device as claimed in claim 1, wherein said processing unit includes an angle analyzing module configured to obtain the included angle by analyzing the output signal received from said sensing unit, and a thickness analyzing module configured to estimate a thickness of an object clamped between the first and second grilling units based on the included angle.

3. The measuring device as claimed in claim 2, the second grilling unit including a handle pivotally connected to the first grilling unit, and a grilling plate pivotally connected to the handle by a joint in a manner that the grilling plate vertically moves when the handle rotates with respect to the first grilling unit about the rotation axis, wherein the included angle is defined between the handle and the first grilling unit, wherein said thickness analyzing module is configured to calculate the thickness of the object based on a reference length and the included angle according to a trigonometric function, the reference length being related to a distance from the joint to the rotation axis.

4. The measuring device as claimed in claim 2, wherein said angle analyzing module includes:

a converter configured to convert the output signal into a digital value indicative of the angle of rotation of the magnetic field; and a calibrator storing an initial angular value related to an initial angular position of the magnetic field generated by said magnetic unit with respect to said sensing unit when the second grilling unit lies on the first grilling unit, and configured to calculate an included angle value of the included angle by subtracting the initial angular value from the digital value when the digital value is not smaller than the initial angular value, and to calculate the included angle value by subtracting the initial angular value from a sum of 360 and the digital value when the digital value is smaller than the initial angular value.

5. The measuring device as claimed in claim 2, wherein said processing unit further includes a clamp-determining module configured to determine whether a variation in an included angle value of the included angle continuously obtained by said angle analyzing module within a predetermined time unit is greater than a predetermined value, to determine whether a latest included angle value is greater than a first threshold when the variation in the included angle value is not greater than the predetermined value, and to output an activation signal to said thickness analyzing module when the latest included angle value is greater than the first threshold, wherein said thickness analyzing module is activated to estimate the thickness of the object upon receipt of the activation signal.

6. The measuring device as claimed in claim 5, wherein said clamp-determining module is further configured to determine whether the latest included angle value is smaller than a second threshold that is greater than the first threshold when the variation in the included angle value is not greater than the predetermined value, and to output the activation signal when the latest included angle value is greater than the first threshold and smaller than the second threshold.

7. The measuring device as claimed in claim 1, wherein said magnetic unit includes a magnet for generating the magnetic field and to be mounted at a position where the rotation axis passes through, and said sensing unit includes a magnetic rotary position sensor spaced apart from said magnet along the rotation axis, one of said magnet and said magnetic rotary position sensor being rotatable with respect to the other one of said magnet and said magnetic rotary position sensor about a central axis thereof that coincides the rotation axis.

8. The measuring device as claimed in claim 1, wherein said magnetic unit includes a magnet for generating the magnetic field and to be mounted in a manner that a central axis thereof coincides the rotation axis, and said sensing unit includes a plurality of magnetic rotary position sensors that are angularly spaced apart from one another with respect to the rotation axis and that surround said magnet.

9. The sensing device as claimed in claim 1, wherein said magnetic unit includes a plurality of magnets for generating the magnetic field, arranged around a central point which the rotation axis passes through, and angularly spaced apart from one another with respect to the rotation axis, wherein said sensing unit includes a magnetic rotary position sensor disposed out of the smallest imaginary circle that encircles said magnets and that has the central point as a center.

10. The measuring device as claimed in claim 1, wherein said magnetic unit is configured to be mounted on the second grilling unit, and said sensing unit is configured to be mounted on the first grilling unit, and relative rotation between said magnetic unit and said sensing unit is brought about by rotational movement of the second grilling unit with respect to the first grilling unit.

11. A grilling apparatus comprising:

a grill device including a first grilling unit, and a second grilling unit pivotally and connected to said first grilling unit and rotatable with respect to said first grilling unit about a rotation axis; and a measuring device including a magnetic unit mounted on one of said first and second grilling units, and configured to generate a magnetic field, a sensing unit mounted on the other one of said first and second grilling units, and configured to measure an angle of rotation of the magnetic field generated by said magnetic unit and to generate an output signal indicating the angle of rotation of the magnetic field, and a processing unit communicatively connected to said sensing unit for receiving the output signal therefrom, and configured to obtain an included angle between said first and second grilling units based on the angle of rotation of the magnetic field indicated by the output signal;

wherein said magnetic unit is to be mounted in a manner that the rotation axis passes through a smallest imaginary circle encircling said magnetic unit, said sensing unit is spaced apart from said magnet unit, and one of said magnet unit and said sensing unit is rotatable with respect to the other one of said magnet unit and said sensing unit about the rotation axis.

12. The grilling apparatus as claimed in claim 11, wherein:

said first grilling unit includes a first grilling plate having a free end and a pivot end opposite to each other in a direction transverse to the rotation axis, a first pivot seat connected to said pivot end of said first grilling plate and formed with an insertion hole that extends along the rotation axis, and a mounting plate arranged side by side with said first pivot seat along the rotation axis, said second grilling unit includes a second pivot seat pivotally connected to one side of said first pivot seat that is opposite to said mounting plate, a connecting pin extending through said insertion hole and connected to said second pivot seat so as to pivotally connect said second pivot seat to said first pivot seat, a handle fixedly connected to said second pivot seat, and a second grilling plate pivotally connected to said handle by a joint in a manner that said second grilling plate vertically moves when said handle rotates with respect to said first grilling unit about the rotation axis, and said connecting pin includes a head portion disposed proximate to said mounting plate and away from said second pivot seat, said magnetic unit is mounted on said head portion, and said sensing unit is mounted on said mounting plate and is spaced apart from said magnetic unit along the rotation axis.

13. The grilling apparatus as claimed in claim 12, wherein said first pivot seat includes a base wall, and a plurality of protrusions formed on one side of said base wall that faces said mounting plate, wherein said insertion hole extends through said base wall, and includes a large portion proximate to said mounting plate and having a first internal diameter, a small portion away from said mounting plate and having a second internal diameter smaller than the first internal diameter, and an intermediate portion between said large portion and said small portion and having a diameter that gradually reduces from said large portion to said small portion, and wherein said head portion of said connecting pin is retained in said large portion and said intermediate portion, and said connecting pin further includes a pin body that extends from said head portion through said small portion toward said second pivot seat and that is connected to said second pivot seat.

14. The grilling apparatus as claimed in claim 11, wherein said second grilling unit includes a handle pivotally connected to said first grilling unit, and a grilling plate pivotally connected to said handle at a joint in a manner that said grilling plate vertically moves when said handle rotates with respect to said first grilling unit, wherein the included angle is defined between said handle and said first grilling unit, and wherein said processing unit includes an angle analyzing module configured to obtain the included angle by analyzing the output signal received from said sensing unit, and a thickness analyzing module configured to calculate a thickness of an object clamped between said first and second grilling units based on a reference length and the included angle according to a trigonometric function, the reference length being related to a distance from said joint to the rotation axis.

15. The grilling apparatus as claimed in claim 14, wherein said angle analyzing module includes:

a converter configured to convert the output signal into a digital value indicative of the angle of rotation of the magnetic field; and a calibrator storing an initial angular value related to an initial angular position of the magnetic field generated by said magnetic unit with respect to said sensing unit when said second grilling unit lies on said first grilling unit, and configured to calculate an included angle value of the included angle by subtracting the initial angular value from the digital value when the digital value is not smaller than the initial angular value, and to calculate the included angle value by subtracting the initial angular value from a sum of 360 and the digital value when the digital value is smaller than the initial angular value.

16. The grilling apparatus as claimed in claim 14, wherein said processing unit further includes a clamp-determining module configured to determine whether a variation in an included angle value of the included angle continuously obtained by said angle analyzing module within a predetermined time unit is greater than a predetermined value, to determine whether a latest included angle value is greater than a first threshold and smaller than a second threshold that is greater than the first threshold when the variation in the included angle value is not greater than the predetermined value, and to output an activation signal to said thickness analyzing module when the latest included angle value is greater than the first threshold and smaller than the second threshold, and wherein said thickness analyzing module is activated to estimate the thickness of the object upon receipt of the activation signal.

17. The grilling apparatus as claimed in claim 11, wherein said magnetic unit includes a magnet for generating the magnetic field and to be mounted at a position where the rotation axis passes through, and said sensing unit includes a magnetic rotary position sensor spaced apart from said magnet along the rotation axis, one of said magnet and said magnetic rotary position sensor being rotatable with respect to the other one of said magnet and said magnetic rotary position sensor about a central axis thereof that coincides the rotation axis.

18. The grilling apparatus as claimed in claim 11, wherein said magnetic unit includes a magnet for generating the magnetic field and to be mounted in a manner that a central axis thereof coincides the rotation axis, and said sensing unit includes a plurality of magnetic rotary position sensors that are angularly spaced apart from one another with respect to the rotation axis and that surround said magnet.

19. The grilling apparatus as claimed in claim 11, wherein said magnetic unit includes a plurality of magnets for generating the magnetic field, arranged around a central point which the rotation axis passes through, and angularly spaced apart from one another with respect to the rotation axis, wherein said sensing unit includes a magnetic rotary position sensor disposed out of the smallest imaginary circle that encircles said magnets and that has the central point as a center.

20. The grilling apparatus as claimed in claim 11, wherein said magnetic unit is configured to be mounted on said second grilling unit, and said sensing unit is configured to be mounted on said first grilling unit, and relative rotation between said magnetic unit and said sensing unit is brought about by rotational movement of said second grilling unit with respect to said first grilling unit.

* * * * *